United States Patent
Ueki et al.

(10) Patent No.: US 9,148,072 B2
(45) Date of Patent: Sep. 29, 2015

(54) INVERTER APPARATUS

(71) Applicant: Murata Manufacturing Co., Ltd., Nagaokakyo-shi, Kyoto-fu (JP)

(72) Inventors: Koichi Ueki, Nagaokakyo (JP); Junichi Itoh, Nagaokakyo (JP); Yoshiya Ohnuma, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/474,620

(22) Filed: Sep. 2, 2014

(65) Prior Publication Data

US 2014/0369090 A1    Dec. 18, 2014

Related U.S. Application Data

(63) Continuation of application No. PCT/JP2013/057373, filed on Mar. 15, 2013.

(30) Foreign Application Priority Data

Mar. 26, 2012  (JP) .................................. 2012-068572

(51) Int. Cl.
*H02M 1/12* (2006.01)
*H02M 7/5387* (2007.01)
*H02M 1/15* (2006.01)
(Continued)

(52) U.S. Cl.
CPC ............ *H02M 7/53871* (2013.01); *H02M 1/15* (2013.01); *H02M 3/33507* (2013.01);
(Continued)

(58) Field of Classification Search
CPC ..................... H02M 3/33507; H02M 3/33569;
H02M 3/3376; H02M 1/12; H02M 1/32;
H02M 7/48; H02M 7/5387; H02M 7/537;
H02J 3/01; Y02B 10/1433
USPC ............. 363/16, 17, 39, 40, 55, 56.01, 56.02, 363/95, 98, 131, 132
See application file for complete search history.

(56) References Cited

U.S. PATENT DOCUMENTS 5,548,165 A * 8/1996 Mohan et al. .................... 307/36
6,636,107 B2 * 10/2003 Pelly .............................. 327/552
(Continued)

FOREIGN PATENT DOCUMENTS

| JP | 61-251480 A | 11/1986 |
|----|----|----|
| JP | 2004-104901 A | 4/2004 |
| JP | 2007-213904 A | 8/2007 |
| JP | 2010-035377 A | 2/2010 |

OTHER PUBLICATIONS

Official Communication issued in International Patent Application No. PCT/JP2013/057373, mailed on Jun. 18, 2013.

*Primary Examiner* — Adolf Berhane
(74) *Attorney, Agent, or Firm* — Keating & Bennett, LLP

(57) ABSTRACT

In an inverter apparatus, an output voltage of an active filter circuit that steps up and smoothes a DC voltage is converted into an AC voltage by an inverter circuit. The active filter circuit includes a capacitor and a rectifier device connected between an input node and an output node. An inductor, one end of which is connected to the input node and the other end of which is connected the output node through the rectifier device, and a switch device connected between the other end and a low-potential-side line, and a first control circuit for the switch device are provided. The inductor stores energy while the switch device is on and releases the energy while the switch device is off. The rectifier device conducts such that the stored energy of the inductor is released.

20 Claims, 12 Drawing Sheets

(51) Int. Cl.
*H02M 3/335* (2006.01)
*H02M 1/00* (2007.01)
*H02M 3/158* (2006.01)

(52) U.S. Cl.
CPC .......... *H02M 7/5387* (2013.01); *H02M 3/1588* (2013.01); *H02M 2001/007* (2013.01); *H02M 2001/0093* (2013.01)

(56) References Cited

U.S. PATENT DOCUMENTS

| | | | |
|---|---|---|---|
| 8,742,734 B2 * | 6/2014 | Martin et al. | 323/207 |
| 2007/0109823 A1 * | 5/2007 | Rastogi et al. | 363/40 |
| 2015/0194873 A1 * | 7/2015 | Persson et al. | 307/36 |

* cited by examiner

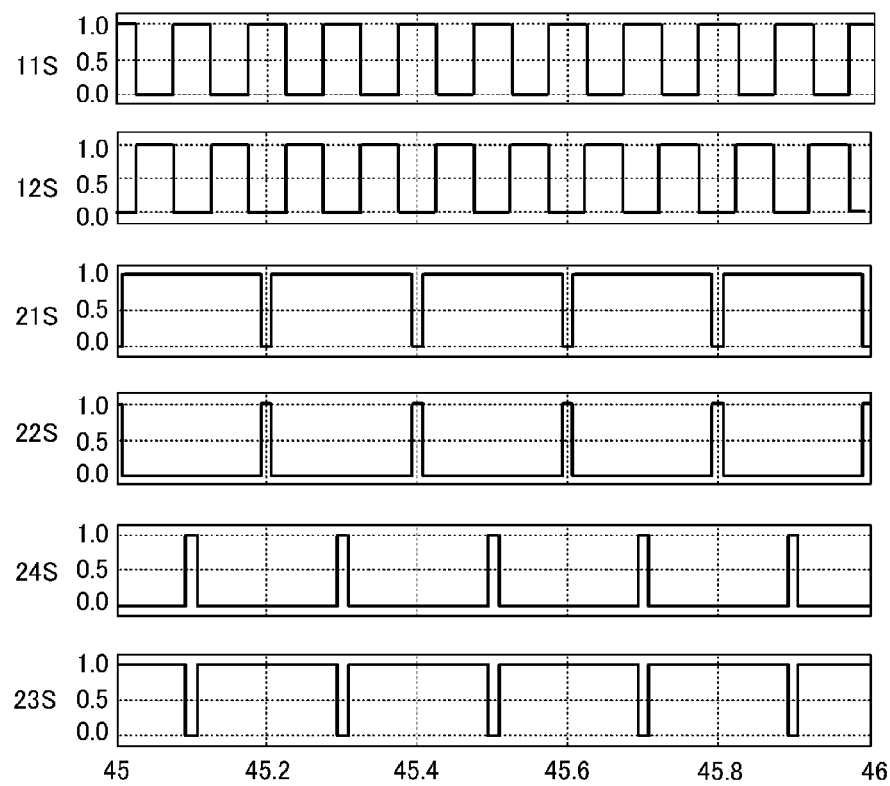

INVERTER APPARATUS

BACKGROUND OF THE INVENTION

1. Field of the Invention

The present invention relates to an inverter apparatus configured to convert an input DC voltage into an AC voltage and output the AC voltage.

2. Description of the Related Art

Japanese Unexamined Patent Application Publication No. 61-251480 discloses an AC power supply apparatus provided with two inverter circuits. The AC power supply apparatus disclosed in Japanese Unexamined Patent Application Publication No. 61-251480 produces a half-wave sine wave voltage by alternately driving the two inverter circuits, outputs a positive voltage from one of the inverter circuits, and outputs a negative voltage from the other of the inverter circuits, thereby outputting an AC voltage. In other words, the AC power supply apparatus disclosed in Japanese Unexamined Patent Application Publication No. 61-251480 produces the positive half cycles and negative half cycles of the output AC voltage by using the two inverter circuits.

In a general inverter apparatus including the AC power supply apparatus disclosed in Japanese Unexamined Patent Application Publication No. 61-251480, a smoothing capacitor is provided in the input stage (on the input side) of an inverter circuit. A current flowing through an AC load via the inverter circuits has a full-wave rectified waveform having a frequency of twice a utility power supply, whereby a ripple with the frequency described above is generated in an input voltage input to the inverter circuits. When the input voltage varies, not only does it become difficult to control the inverter circuit, but also it becomes impossible to transmit a sine wave current when the AC load is a power system (grid), thereby causing voltage waveform distortion. The smoothing capacitor is provided to suppress the ripple of an input voltage. The smaller the desired ripple of the input voltage after suppression, the higher the required capacitance of a capacitor, and hence, an electrolytic capacitor will be used, for example. However, since the lifetime of an electrolytic capacitor is short, the lifetime of an apparatus is limited. Hence, instead of using a high-capacitance capacitor, such as an electrolytic capacitor, it is desired to use a capacitor with a low capacitance, such as, for example, a film capacitor with little change over the years as a smoothing capacitor. However, when a capacitor with a low capacitance, such as a film capacitor, is used as a smoothing capacitor, a sufficient ripple suppression effect is not obtained.

SUMMARY OF THE INVENTION

Preferred embodiments of the present invention provide an inverter apparatus that sufficiently suppresses a ripple of an input voltage of an inverter circuit without using a smoothing capacitor with a high capacitance.

An inverter apparatus according to a preferred embodiment of the present invention includes an active filter circuit configured to step up and smooth a DC voltage of an input power supply, and an inverter circuit configured to convert the DC voltage stepped up and smoothed by the active filter circuit into an AC voltage. The active filter circuit includes a buffer capacitor connected between an input node and an output node, a rectifier device, an inductor a first end of which is connected to the input node and a second end of which is connected to the output node through the rectifier device, a switch device connected between the second end of the inductor and a low-potential-side line, and a switching control circuit for the switch device. The inductor stores energy while the switch device is on and releases the energy while the switch device is off, and the rectifier device is configured to conduct so as to allow the energy stored in the inductor to be released.

With this configuration, even during a period in which an AC voltage output from the inverter apparatus is near zero volts, energy is stored in the inductor by the switching of the switch device, and with the energy as a voltage to charge the buffer capacitor, the capacitor is charged to the DC voltage of the input power supply. During a period in which the AC voltage output from the inverter apparatus is near the maximum, the capacitor is discharged. As a result of this operation of the active filter, the ripple of the voltage input to the inverter circuit is reduced. Hence, the capacitance of a smoothing capacitor connected to the input stage (input side) of the active filter circuit is reduced. As a result, a smoothing capacitor with a high capacitance is not needed and, hence, for example, a film capacitor or the like with little change over the years can be used instead of an electrolytic capacitor. Further, also during a period in which the current flowing in the AC load is near zero, a current is input from the input power supply, and during a period in which the current flowing through the AC load is near the maximum, a current is output from the buffer capacitor to the AC load through the inverter circuit, such that a DC power is effectively drawn from the input power supply.

It is preferable that the switching control circuit is configured or programmed to control a voltage across the buffer capacitor, being charged, through PWM control of the switch device in such a manner that a voltage ripple of an output voltage of the active filter circuit is suppressed.

The voltage across the smoothing capacitor provided in the active filter circuit varies in accordance with a current supplied from the active filter circuit to the AC load through the inverter circuit. However, by switching the switch device on/off through PWM control, variations in the output voltage of the active filter circuit, that is, variations in the voltage input to the inverter circuit are suppressed.

When the rectifier device is a diode, the circuit configuration is simplified since the switching control is not needed.

When the rectifier device is a MOSFET or an insulated gate bipolar transistor (IGBT), the conduction loss is reduced.

When the switch device is a MOSFET or an IGBT, the conduction loss is reduced. In particular, by including an IGBT, a high-speed operation is possible and the breakdown resistance becomes large, such that high reliability is realized.

When the rectifier device and the switch device are portions of a plurality of power switch devices housed in an intelligent power module (IPM), the number of mounted components is decreased and the component cost is reduced, such that reduction in size and cost is realized.

When the inverter circuit includes a bridge connection of four switch devices and these switch devices are the power switches housed in the IPM, the number of the mounted components is further reduced and the component cost is reduced, such that further reduction in size and cost is realized.

An insulating DC-DC converter may be provided between the active filter circuit and the input power supply. With this configuration, the input power supply and the inverter circuit is insulated from each other.

According to various preferred embodiments of the present invention, since the ripple of an input voltage input to an inverter circuit is reduced by the operation of an active filter, the capacitance of a smoothing capacitor connected to the input stage (input side) of the active filter is reduced.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a diagram illustrating the gate signal waveforms of the respective switch devices when the phase angle of an output voltage is 90°.

FIG. 8 is a diagram illustrating the simulation conditions and the numerical results of simulation.

DETAILED DESCRIPTION OF THE PREFERRED EMBODIMENTS

First Preferred Embodiment

Figure 1:
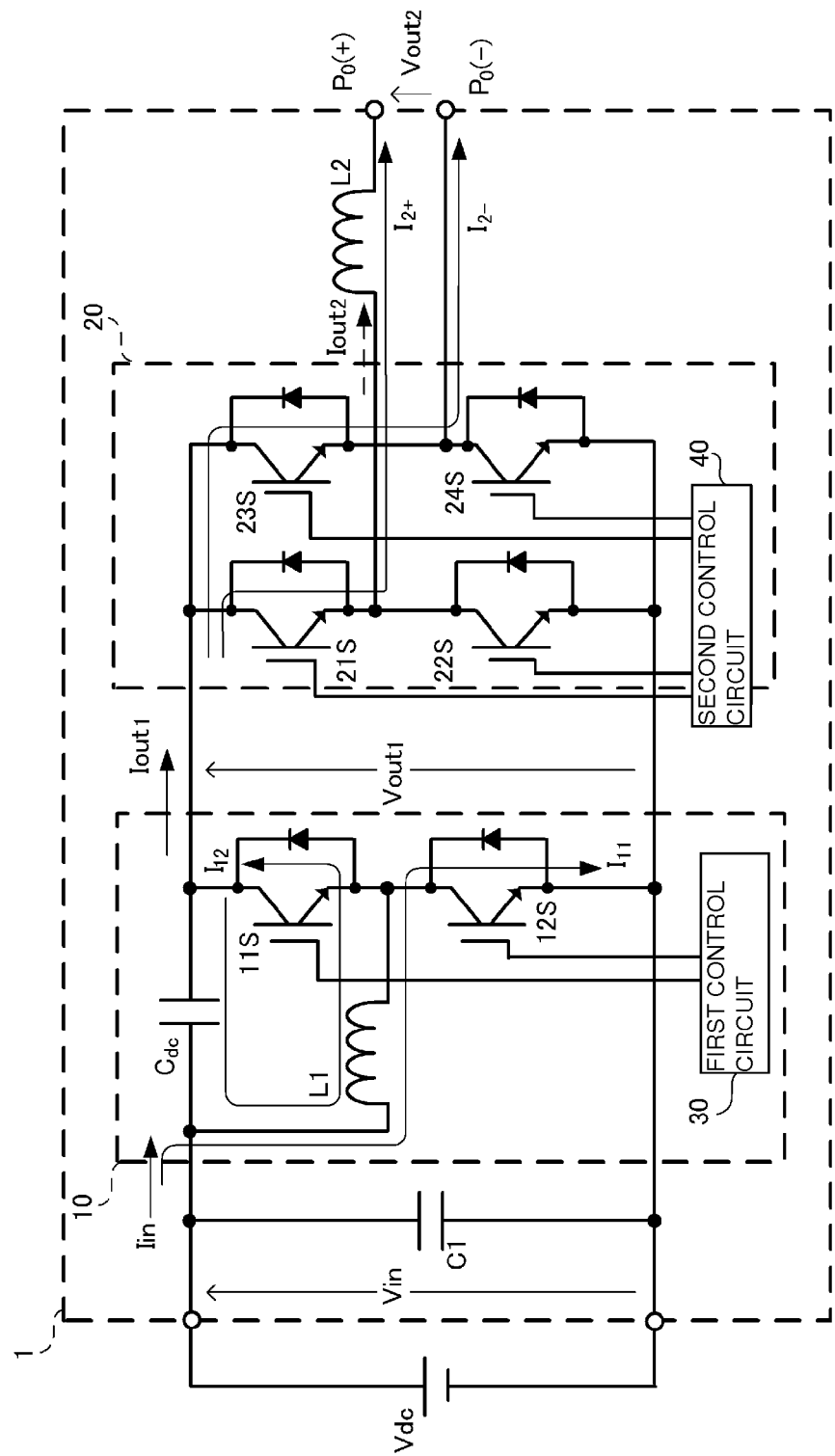
FIG. 1 is a circuit diagram of an inverter apparatus according to a first preferred embodiment of the present invention.

FIG. 1 is a circuit diagram of an inverter apparatus according to a first preferred embodiment of the present invention. An inverter apparatus 1 according to the present preferred embodiment is preferably used in, for example, a photovoltaic power generation system. Output terminals $P_0(+)$ and $P_0(-)$ of the inverter apparatus 1 are connected to, for example, a power system load. The inverter apparatus 1 converts DC power converted from solar energy into AC power and outputs the AC power to an AC load. The inverter apparatus 1 of the present preferred embodiment preferably outputs a 200 V AC voltage with a frequency of 50 Hz to the AC load, for example.

The inverter apparatus 1 includes an active filter circuit 10 and an inverter circuit 20. A DC power supply Vdc and a smoothing capacitor C1 are connected to the input stage (input side) of the active filter circuit 10. The DC power supply Vdc is, for example, a solar battery panel. Hereinafter, an input voltage input from the DC power supply Vdc to the active filter circuit 10 will be denoted by Vin. The smoothing capacitor C1 smoothes Vin.

The active filter circuit 10 includes a buffer capacitor Cdc (hereinafter, simply called a capacitor Cdc) connected between an input node and an output node and includes a rectifier device 11S. Here, the input node is a high-potential-side connection node between the DC power supply Vdc and the active filter circuit 10, and the output node is a high-potential-side connection node between the active filter circuit and the inverter circuit 20. The active filter circuit 10 also includes an inductor L1 a first end of which is connected to the input node and the second end of which is connected to the output node through the rectifier device 11S, a switch device 12S connected between the second end of the inductor L1 and a ground line, and a first control circuit 30 which is a control circuit for the switch device 12S.

The rectifier device 11S and the switch device 12S according to the present preferred embodiment are IGBTs and each include a body diode. The collector of the rectifier device 11S is connected to the output side of the capacitor Cdc. The inductor L1 is connected to the input side of the capacitor Cdc and the emitter of the rectifier device 11S. The collector of the switch device 12S is connected to the emitter of the rectifier device 11S and the emitter of the switch device 12S is connected to the low-potential-side line of the active filter circuit 10. The low-potential-side line is a line connected to the low-potential-side of the DC power supply Vdc. The rectifier device 11S and the switch device 12S are subjected to pulse-width-modulation (PWM) control performed by the first control circuit 30.

The rectifier device 11S and the switch device 12S are alternately (complementarily) switched on/off by the first control circuit 30. When the switch device 12S is on and the rectifier device 11S is off, a current $I_{11}$ flows through a path going through the inductor L1 and the switch device 12S. Energy is stored in the inductor L1 by the current $I_{11}$. When the switch device 12S is switched off and the rectifier device 11S is switched on, a current $I_{12}$ flows through a closed loop including the inductor L1, the rectifier device 11S, and the capacitor Cdc. The capacitor Cdc is charged by the current $I_{12}$. When the voltage across the capacitor Cdc being charged is denoted by Vcdc and the output voltage of the active filter circuit 10 is denoted by Vout1, the output voltage Vout1 is the sum of an input voltage Vin and the voltage Vcdc.

The inverter circuit 20 is connected to the output stage (output side) of the active filter circuit 10. The inverter circuit 20 generates the positive half cycles and negative half cycles of an AC voltage from the output voltage Vout1 output from the active filter circuit 10, and outputs these half cycles. In the inverter circuit 20, a series circuit including a switch device 21S and a switch device 22S and a series circuit including a switch device 23S and a switch device 24S are connected in parallel with each other. These series circuits are connected between the high-potential-side line and the low-potential-side line in such a manner that the switch devices 21S and 23S are on the high side and the switch devices 22S and 24S are on the low side. Each of the switch devices 21S, 22S, 23S, and 24S is subjected to PWM control performed by a second control circuit 40. Each of the switch devices 21S, 22S, 23S, and 24S includes a body diode.

A connection node between the switch devices 21S and 22S is connected to the output terminal $P_0(+)$ through an inductor L2. The switch devices 23S and 24S are connected to the output terminal $P_0(-)$. An AC load is connected to the output terminals $P_0(+)$ and $P_0(-)$, and an AC voltage output from the inverter apparatus 1 is applied to the AC load.

The inverter circuit 20, using the output voltage Vout1 output from the active filter circuit 10 as a power supply voltage, outputs a positive and negative AC voltage by switching the switch device 21S and the switch device 24S on and off and switching the switch device 22S and the switch device 23S on and off. Specifically, a current $I_{2+}$ flows through an AC load when the switch device 21S and the switch device 24S are on and the switch device 22S and the switch device 23S are off. A current $I_{2-}$ flows through the AC load when the switch device 22S and the switch device 23S are on and the switch device 21S and the switch device 24S are off.

Hereinafter, the first control circuit 30 and the second control circuit 40 will be described.

Figure 2:
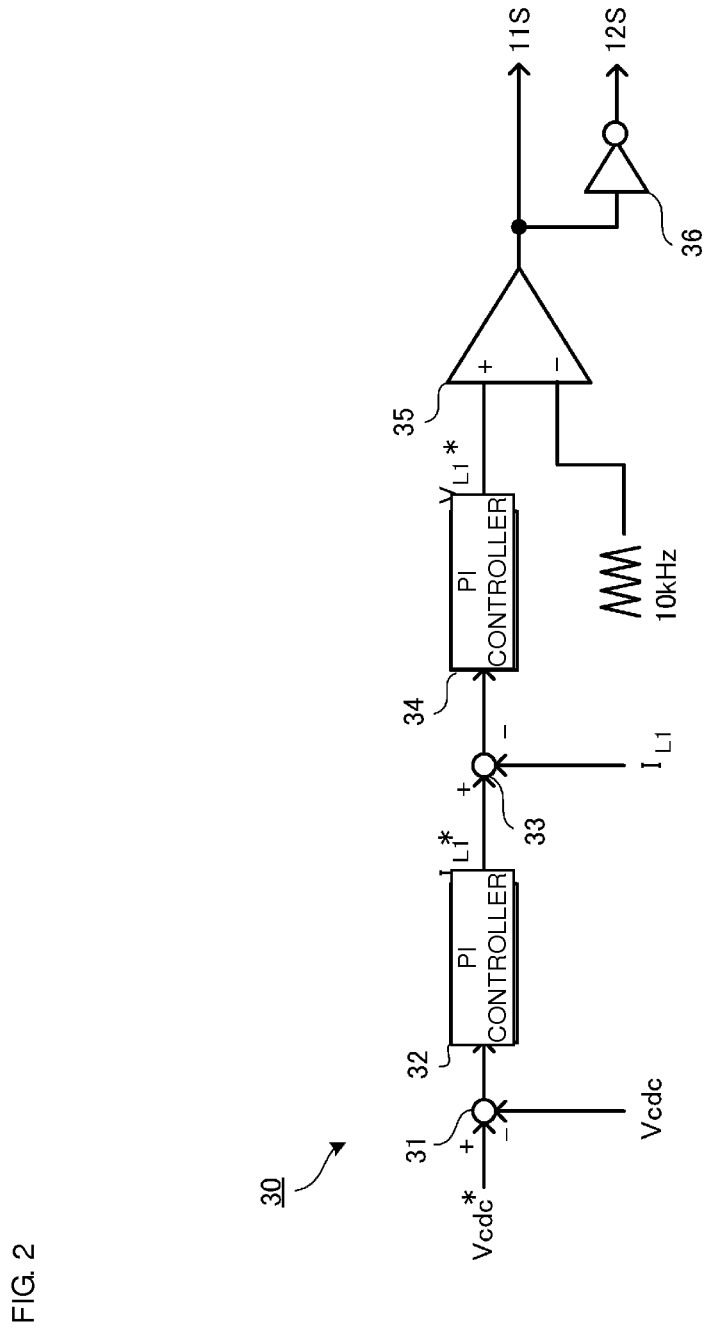
FIG. 2 is a configuration diagram of a first control circuit.

FIG. 2 is a configuration diagram of the first control circuit 30. Hereinafter, a current flowing through the inductor L1 is denoted by $I_{L1}$. The first control circuit 30 is configured or programmed to subject the rectifier device 11S and the switch device 12S to PWM control at a frequency of 10 kHz, for example, in such a manner that the voltage Vcdc across the capacitor Cdc, being charged, becomes an instructed voltage (target voltage) Vcdc*.

A subtractor 31 is configured to compute an error between the voltage Vcdc across the capacitor Cdc being charged and the instructed voltage Vcdc*. A PI controller 32 is configured or programmed to compute an instructed current $I_{L1}$* that is to flow through the inductor L1 by using PI control (proportional and integral control) based on the error computed by the subtractor 31. A subtractor 33 is configured to compute an error between the target current $I_{L1}$* and the current $I_{L1}$ flowing through the inductor L1. A PI controller 34 is configured or programmed to compute an instructed voltage $V_{L1}$* to be applied to the inductor L1 by using PI control (proportional and integral control) based on the error computed by the subtractor 33. A comparator 35 is configured to compare the result obtained by the PI controller 34 with a triangle wave with a frequency of 10 kHz, thus outputting a PWM wave. The PWM wave output by the comparator 35 is input to the rectifier device 11S. The PWM wave output by the comparator 35 is inverted by an inverter 36 and the inverted PWM wave is input to the switch device 12S.

Figure 3:
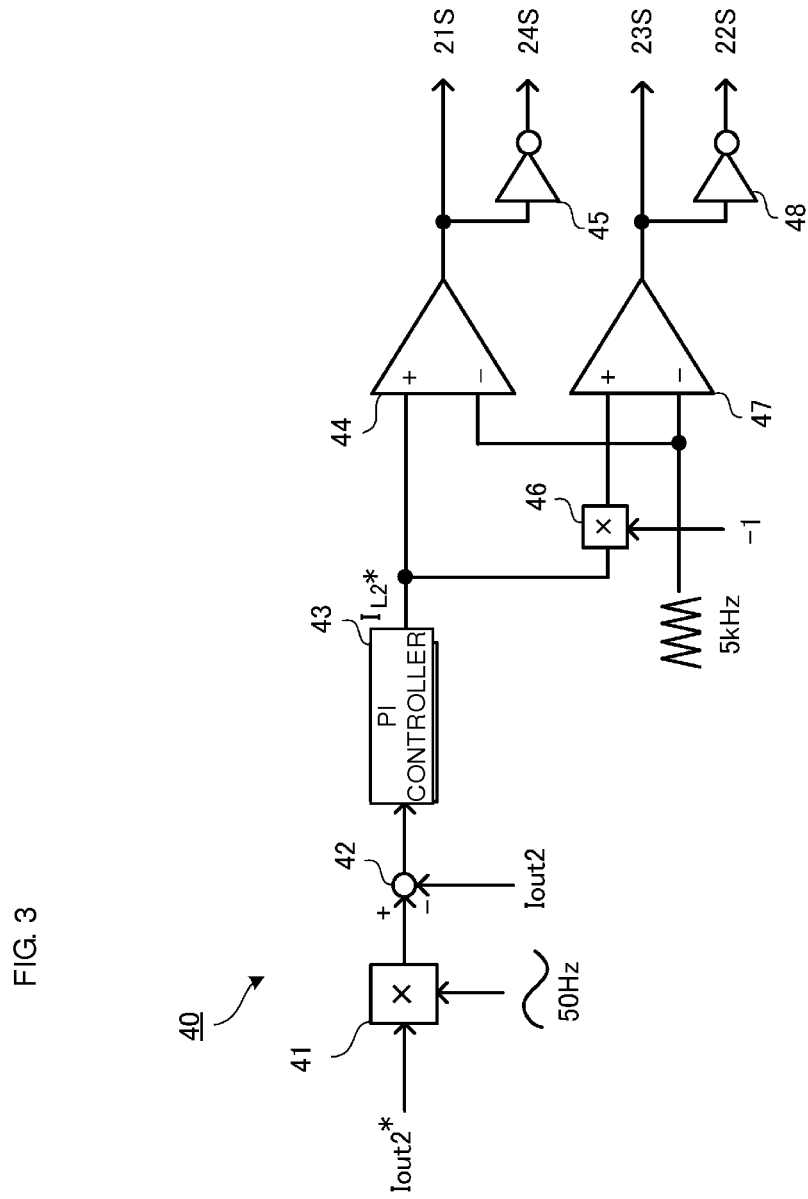
FIG. 3 is a configuration diagram a second control circuit.

FIG. 3 is a configuration diagram of the second control circuit 40. The second control circuit 40 is configured to subject the switch devices 21S, 22S, 23S, and 24S to PWM control at a frequency of 5 kHz, for example, in such a manner that an output current Iout2 of the inverter circuit 20 becomes an instructed current (target current) Iout2*.

A multiplier 41 is configured to multiply the instructed current Iout2* by a frequency (50 Hz of an AC load in the present preferred embodiment) to be set, and outputs the result to a subtractor 42. The subtractor 42 is configured to compute an error between the output of the multiplier 41 and the output current Iout2 output from the inverter circuit 20, and output the error to a PI controller 43. The PI controller 43 is configured to obtain an instructed current $I_{L2}$* by using PI control based on this error. The instructed current $I_{L2}$* is a current to be made to flow through the inductor L2.

A comparator 44 is configured to output a PWM wave to generate the positive half cycles of an AC voltage. The comparator 44 is configured to compare the output of the PI controller 43 with a triangle wave with a frequency of 5 kHz, for example, thus generating a PWM wave. The PWM wave output by the comparator 44 is input to the switch device 21S. The PWM wave output by the comparator 44 is inverted by an inverter 45 and the inverted PWM wave is input to the switch device 24S.

A comparator 47 is configured to output a PWM wave. A multiplier 46 is configured to multiply the output of the PI controller 43 by −1 and output the result to the comparator 47. Hence, the output signal of the multiplier 46 is input to the comparator 47. The comparator 47 is configured to compare the output signal of the multiplier 46 with a triangle wave with a frequency of 5 KHz, for example, thus generating a PWM wave. The PWM wave output by the comparator 47 is input to the switch device 23S. The PWM wave output by the comparator 47 is inverted by an inverter 48 and the inverted PWM wave is input to the switch device 22S.

Hereinafter, a gate signal output by the first control circuit 30 to the rectifier device 11S and the switch device 12S, and a gate signal output by the second control circuit 40 to the switch devices 21S, 22S, 23S, and 24S will be described.

Figure 4:
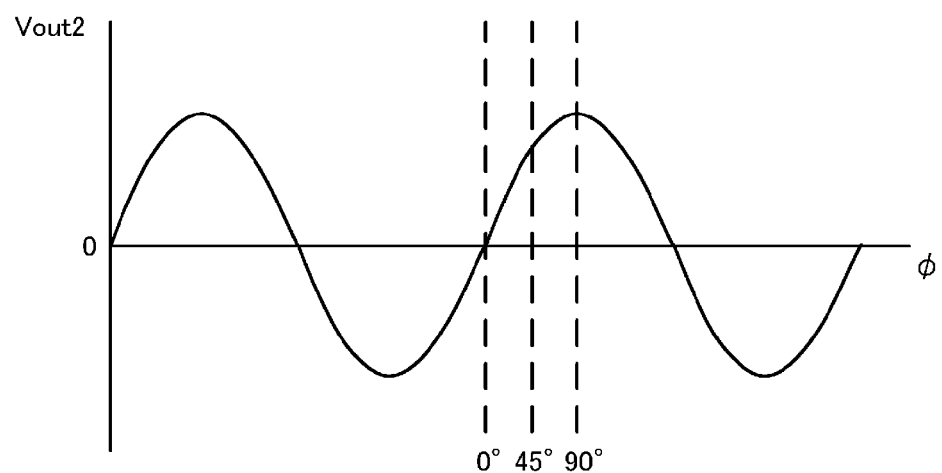
FIG. 4 is a waveform diagram of an output voltage of the inverter apparatus.

FIG. 4 is a waveform diagram of an output voltage Vout2 of the inverter apparatus 1. In the present preferred embodiment, the first control circuit 30 and the second control circuit 40 perform PWM control with different duty ratios in accordance with a phase angle φ of the output voltage Vout2. Hereinafter, the PWM control at the time when the phase angle φ of the output voltage Vout2 preferably is near 0°, 45°, and 90°, for example, as illustrated in FIG. 4 will be described.

Figure 5:
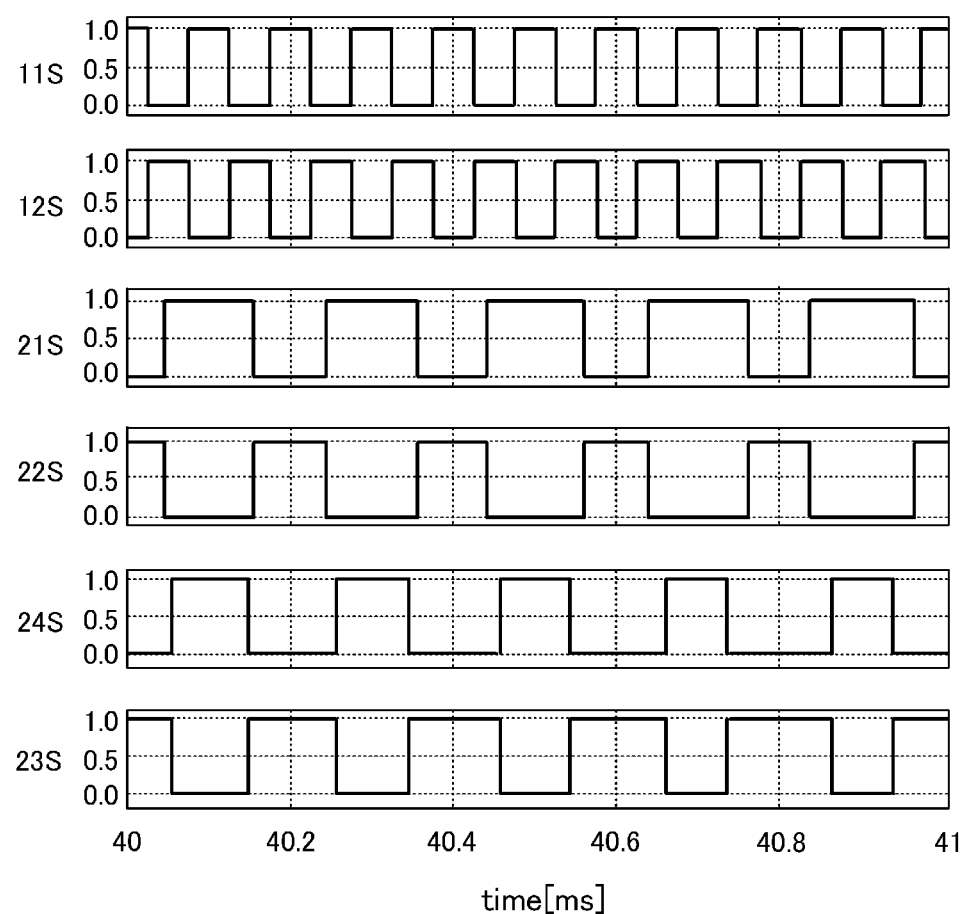
FIG. 5 is a diagram illustrating the gate signal waveforms of respective switch devices when the phase angle of an output voltage is 0°.
Figure 6:
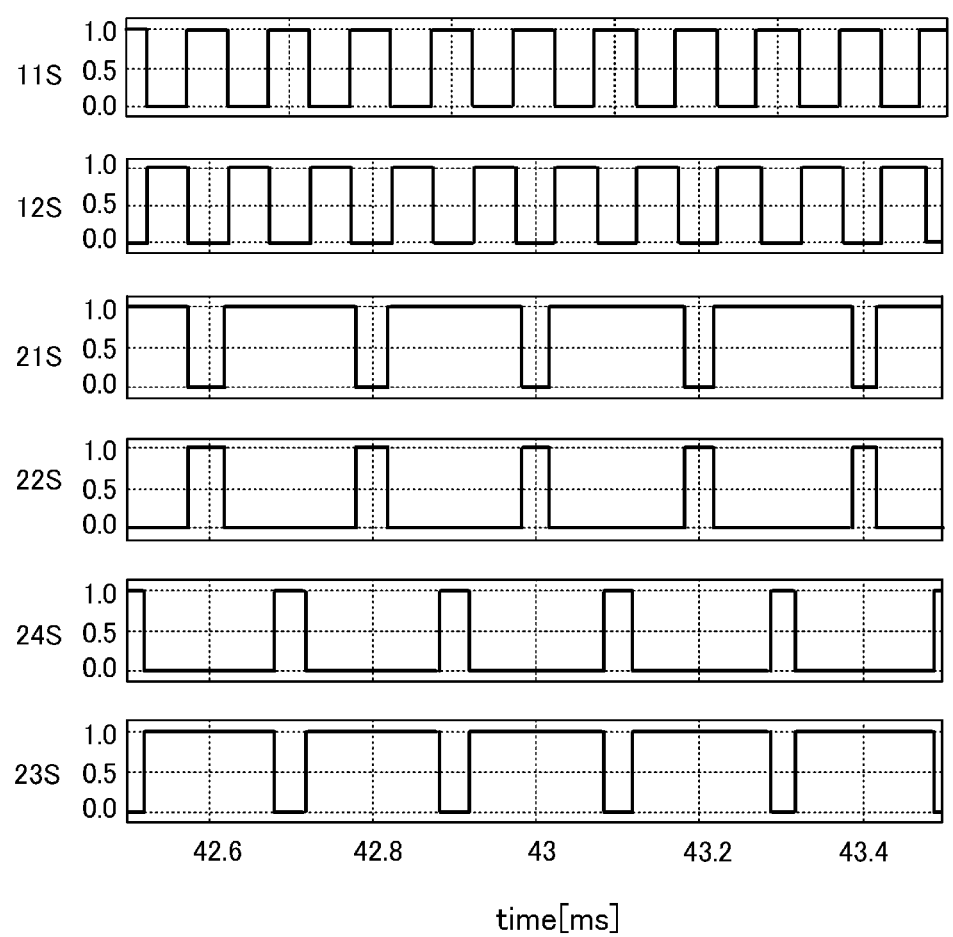
FIG. 6 is a diagram illustrating the gate signal waveforms of the respective switch devices when the phase angle of an output voltage is 45°.

FIG. 5 is a diagram illustrating the gate signal waveforms of the respective switch devices when the phase angle φ of the output voltage Vout2 is near 0°. FIG. 6 is a diagram illustrating the gate signal waveforms of the respective switch devices when the phase angle φ of the output voltage Vout2 is near 45°. FIG. 7 is a diagram illustrating the gate signal waveforms of the respective switch devices when the phase angle φ of the output voltage Vout2 is near 90°. In each of FIG. 5, FIG. 6, and FIG. 7, the vertical axis represents applied voltage and the horizontal axis represents time.

As described above, the gate signal (PWM wave) output by the first control circuit 30 to the rectifier device 11S and the switch device 12S has a duty ratio which changes in accordance with the voltage Vcdc* and the input voltage Vin. In the waveforms illustrated in FIG. 5, FIG. 6, and FIG. 7, a setting is made in such a manner that the amplitude (peak to peak) of the instructed voltage Vcdc* becomes about 95.5 V, for example. In this simulation, the degree of the ripple of an input current Iin is determined while the input voltage Vin is kept constant. In fact, Vin changes in accordance with the internal resistance of an input power supply, the capacitance of the smoothing capacitor C1, and the input current Iin. However, since the ripple of the input current Iin is suppressed, the effect of the suppression of a change in the input voltage Vin is capable of being determined. Since the input voltage Vin is made to be constant as described above in this simulation, the amount of change in the duty ratio in accordance with the instructed voltage Vcdc* is small and the duty ratio is nearly constant. Hence, gate signal voltage waveforms applied to the rectifier devices 11S and the switch devices 12S illustrated in FIG. 5, FIG. 6, and FIG. 7 are also nearly the same.

When the phase angle φ is nearly 0°, the on-duty ratio of the switch device 21S and the switch device 23S is the same or approximately the same as the on-duty ratio of the switch device 22S and the switch device 24S. As the phase angle φ is increased to 45° and further to 90°, the on-duty ratio of the switch device 21S and the switch device 23S of the inverter circuit 20 becomes larger than the on-duty ratio of the switch device 22S and the switch device 24S.

Next, the current waveform and the voltage waveform of the inverter apparatus 1 configured as above, in which the switch devices are subjected to PWM control, will be described. Hereinafter, the result of a simulation performed in the inverter apparatus 1 will be illustrated. Regarding the simulation conditions, preferably the output voltage Vout1 of the active filter circuit 10 is 400 V on average, and the output voltage Vout2 of the inverter circuit 20 is an AC voltage of 240

V with a frequency of 50 Hz, for example. In FIG. 1, it is assumed that the capacitance C1 is 100 μF, the capacitance Cdc is 50 μF, the inductance L1 is 6 mH, and the inductance L2 is 36 mH, for example. Each of the rectifier device 11S and the switch device 12S preferably is subjected to PWM control at a frequency of 10 kHz, for example, and each of the switch devices 21S, 22S, 23S, and 24S preferably is subjected to PWM control at a frequency of 5 kHz, for example.

Figure 9A:
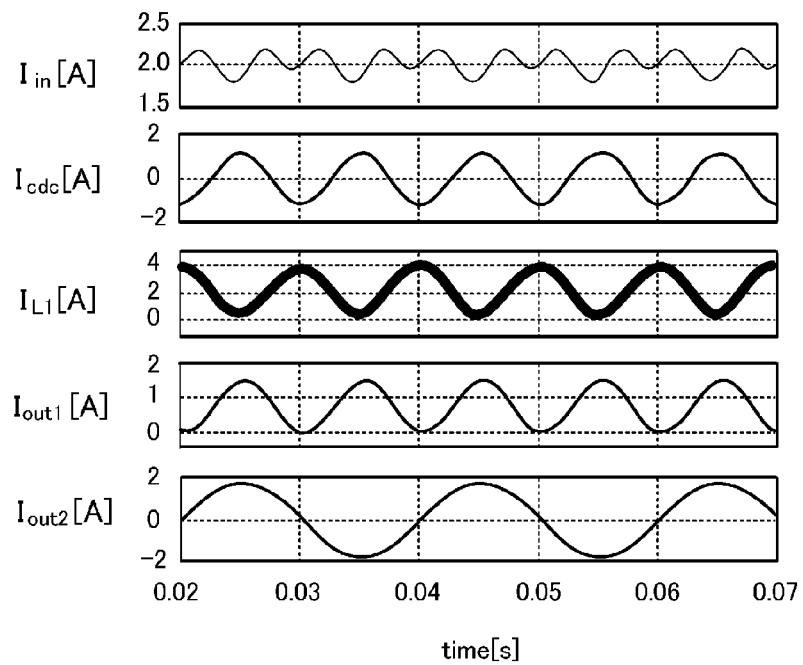
FIG. 9A illustrates the current waveforms of the simulation results for condition (1).
Figure 9B:
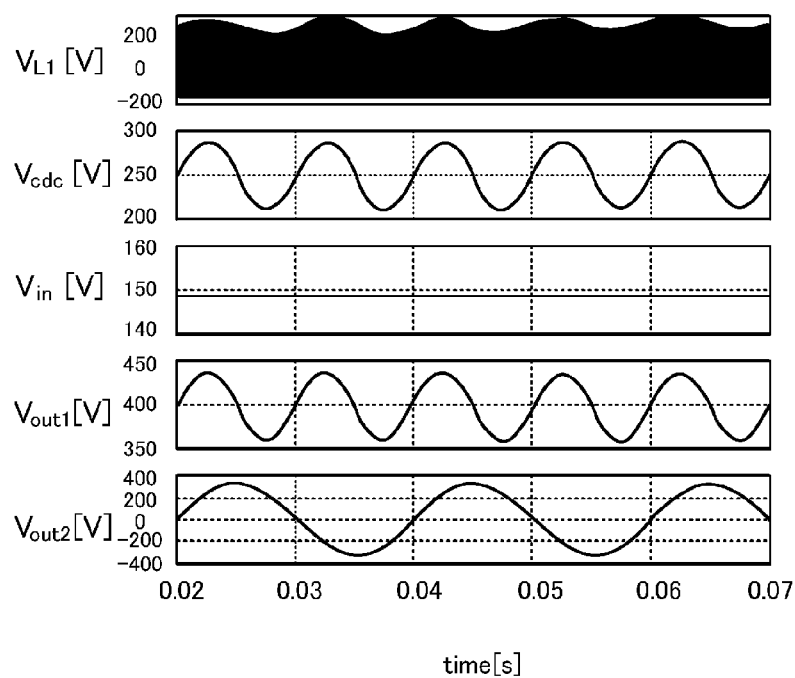
FIG. 9B illustrates the voltage waveforms of the simulation results for condition (1).
Figure 10A:
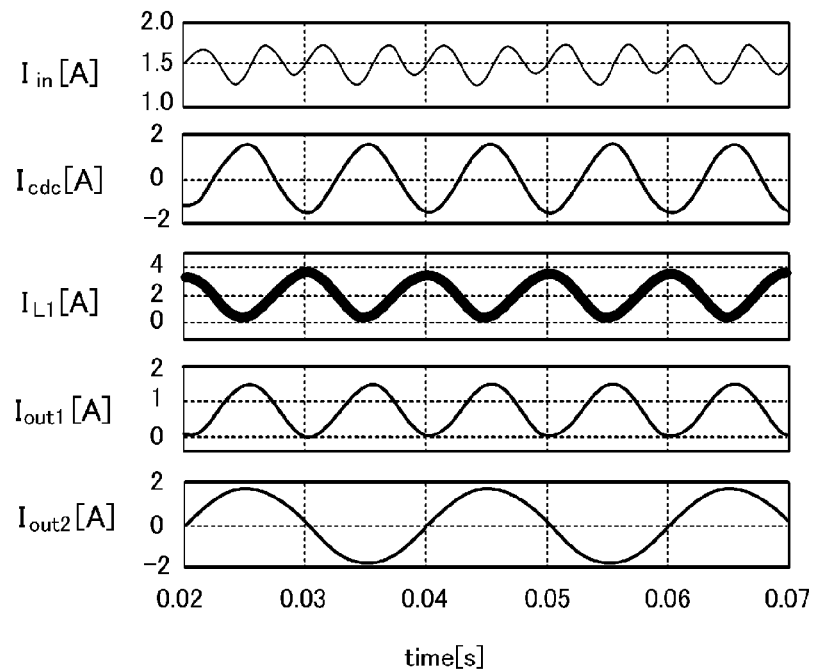
FIG. 10A illustrates the current waveforms of the simulation results for condition (2).
Figure 10B:
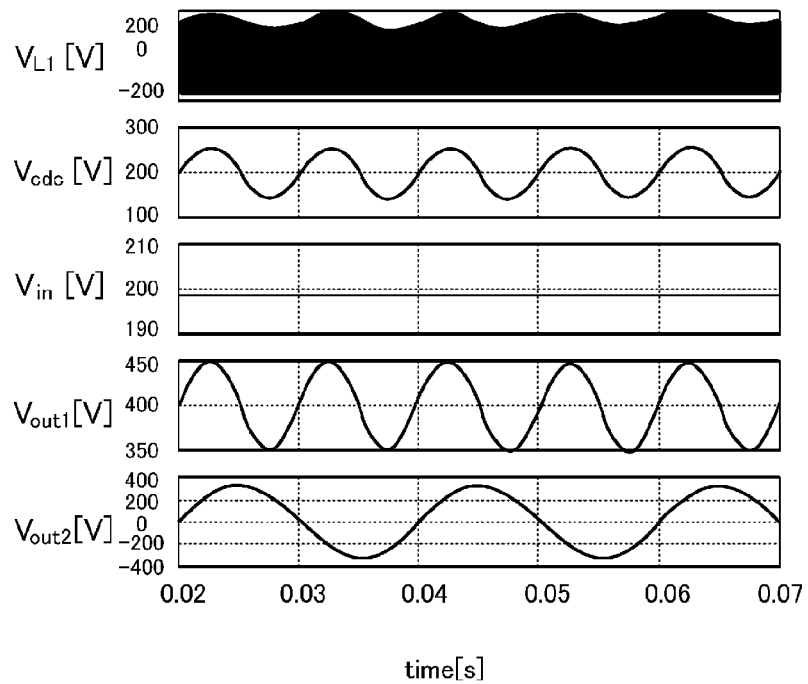
FIG. 10B illustrates the voltage waveforms of the simulation results for condition (2).
Figure 11A:
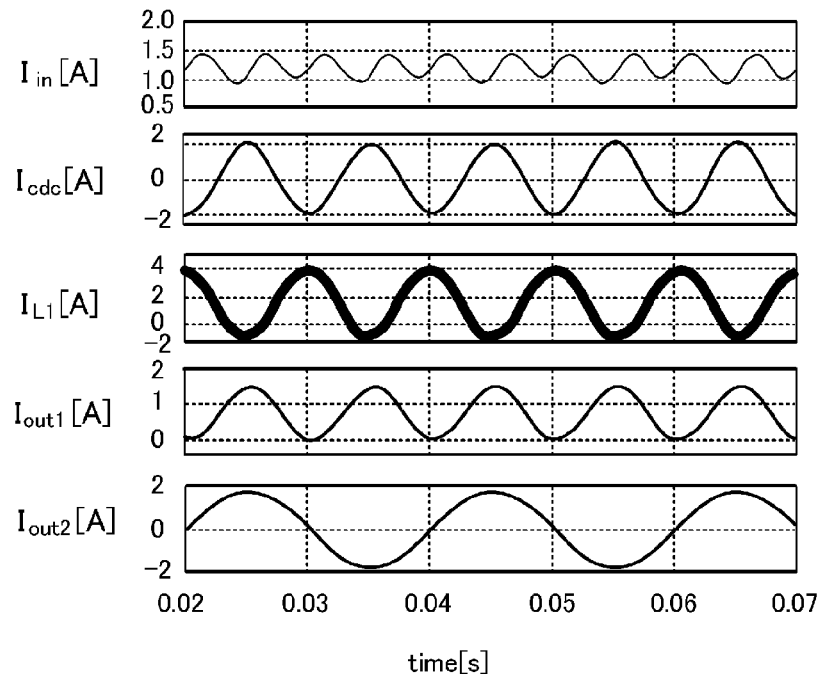
FIG. 11A illustrates the current waveforms of the simulation results for condition (3).
Figure 11B:
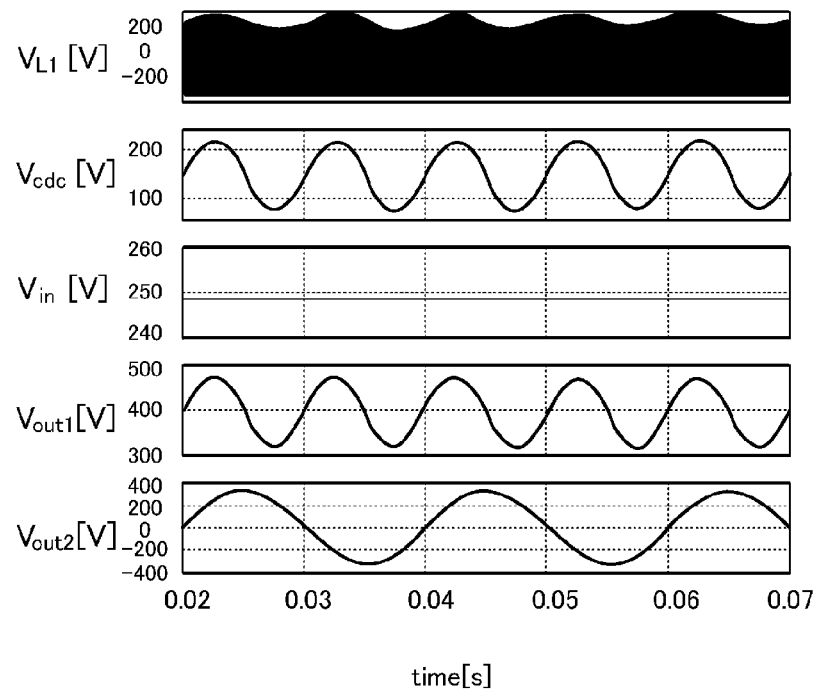
FIG. 11B illustrates the voltage waveforms of the simulation results for condition (3).

FIG. 8 is a diagram illustrating the simulation conditions and the numerical results of the simulation. In FIG. 8, the simulation conditions and numerical results for the respective cases of condition (1), condition (2), and condition (3) are illustrated. FIG. 9A illustrates the current waveforms of the simulation results for condition (1), and FIG. 9B illustrates the voltage waveforms of the simulation results for condition (1). FIG. 10A illustrates the current waveforms of the simulation results for condition (2), and FIG. 10B illustrates the voltage waveforms of the simulation results for condition (2). FIG. 11A illustrates the current waveforms of the simulation results for condition (3), and FIG. 11B illustrates the voltage waveforms of the simulation results for condition (3).

Referring to FIG. 8, as the simulation conditions, the input voltage Vin, an average Vcdcave for the voltage Vcdc across the capacitor Cdc being charged, the amplitude (peak to peak) ΔVcdc of the voltage Vcdc across the capacitor Cdc, and the output power Pout of the active filter circuit 10 are provided. As the simulation results, Icdc is a current flowing through the capacitor Cdc, and $I_{L1}$ is a current flowing through the inductor L1. The horizontal axis of each of the graphs illustrated in FIG. 9, FIG. 10, and FIG. 11 represents time in seconds.

Under condition (1), the input voltage Vin of 150 V is input to the active filter circuit 10. In this case, the input current Iin input to the active filter circuit 10 is a current having an average of about 2.0 A, for example, and including a ripple. As a result of the rectifier device 11S and the switch device 12S being subjected to on/off control, the current Icdc, the current $I_{L1}$, and an output current Iout1 become currents each including a ripple. The current Icdc is a current with a maximum value of about 1.26 A, for example, (refer to FIG. 8), and flows as a current including a ripple as a result of the switching of the switch device 12S. The current $I_{L1}$ preferably has a maximum value of about 4.1 A, for example, (refer to FIG. 8), and always flows in the same direction. The current Iout1 preferably has a maximum value of about 1.26 A, for example, similarly to the current Icdc. An AC current including positive half cycles and negative half cycles is generated by the switch devices 21S, 22S, 23S, and 24S subjected to on/off control from the output of the active filter circuit 10, such that the current Iout2 is output from the inverter circuit 20.

Further, under condition (1), a voltage of from about −150 V to about 200 V, for example, is applied to the inductor L1. The voltage Vcdc of about 250 V, for example, is applied to the capacitor Cdc. Specifically, the voltage Vcdc preferably has an AC waveform with the center at about 250 V and the amplitude of about 76.4 V, for example, (refer to FIG. 8). The output voltage Vout1 of the active filter circuit 10 becomes a voltage which is the sum of the voltage Vin and the voltage Vcdc. In other words, the voltage Vout1 preferably becomes approximately 400 V, for example. An AC voltage including positive half cycles and negative half cycles is generated from the output of the active filter circuit 10 by the switch devices 21S, 22S, 23S, and 24S subjected to on/off control, such that the voltage Vout2 is output from the inverter circuit 20.

Under condition (2), the input voltage Vin of about 200 V, for example, preferably is input to the active filter circuit 10. In this case, the input current Iin input to the active filter circuit 10 is a current including a ripple with an average of about 1.5 A, for example. As a result of the rectifier device 11S and the switch device 12S being subjected to on/off control, the current Icdc, the current $I_{L1}$, and the output current Iout1 become currents each including a ripple. The current Icdc is a current with a maximum value of about 1.5 A, for example, (refer to FIG. 8), and flows as a current including a ripple as a result of the switching of the switch device 12S. The current $I_{L1}$ preferably has a maximum value of about 4.0 A, for example, (refer to FIG. 8), and always flows in the same direction. The current Iout1 preferably has a maximum value of about 1.5 A, for example, similarly to the current Icdc. An AC current including positive half cycles and negative half cycles is generated by the switch devices 21S, 22S, 23S, and 24S subjected to on/off control from the output of the active filter circuit 10, such that the current Iout2 is output from the inverter circuit 20.

Further, under condition (2), a voltage of from about −200 V to about 200 V, for example, preferably is applied to the inductor L1. The voltage Vcdc of about 200 V, for example, preferably is applied to the capacitor Cdc. Specifically, the voltage Vcdc preferably has an AC waveform with the center at about 200 V and the amplitude of about 95.5 V, for example, (refer to FIG. 8). The output voltage Vout1 of the active filter circuit 10 becomes a voltage which is the sum of the voltage Vin and the voltage Vcdc. In other words, the voltage Vout1 preferably becomes approximately 400 V, for example. An AC voltage including positive half cycles and negative half cycles is generated from the output of the active filter circuit 10 by the switch devices 21S, 22S, 23S, and 24S subjected to on/off control, such that the voltage Vout2 is output from the inverter circuit 20.

Under condition (3), the input voltage Vin of about 250 V, for example, preferably is input to the active filter circuit 10. In this case, the input current Iin input to the active filter circuit 10 preferably is a current including a ripple with an average of about 1.25 A, for example. As a result of the rectifier device 11S and the switch device 12S being subjected to on/off control, the current Icdc, the current $I_{L1}$, and the output current Iout1 become currents each including a ripple. The current Icdc preferably is a current with a maximum value of about 1.6 A, for example, (refer to FIG. 8), and flows as a current including a ripple as a result of the switching of the switch device 12S. The current $I_{L1}$ preferably has a maximum value of about 3.7 A, for example, (refer to FIG. 8), and always flows in the same direction. The current Iout1 preferably has a maximum value of about 1.6 A, for example, similarly to the current Icdc. An AC current including positive half cycles and negative half cycles is generated by the switch devices 21S, 22S, 23S, and 24S subjected to on/off control from the output of the active filter circuit 10, such that the current Iout2 is output from the inverter circuit 20.

Further, under condition (3), a voltage of from about −250 V to about 200 V, for example, preferably is applied to the inductor L1. The voltage Vcdc of about 150 V, for example, preferably is applied to the capacitor Cdc. Specifically, the voltage Vcdc preferably has an AC waveform with the center at about 150 V and the amplitude of about 127.32 V, for example (refer to FIG. 8). The output voltage Vout1 of the active filter circuit 10 becomes a voltage which is the sum of the voltage Vin and the voltage Vcdc. In other words, the voltage Vout1 preferably becomes approximately 400 V, for example. An AC voltage including positive half cycles and negative half cycles is generated from the output of the active filter circuit 10 by the switch devices 21S, 22S, 23S, and 24S subjected to on/off control, such that the voltage Vout2 is output from the inverter circuit 20.

As can be seen from the waveforms of the simulation results, by appropriately controlling the voltage across the capacitor Cdc of the active filter circuit 10, the ripple of the input current Iin is decreased. This is due to energy movement (a buffering operation) in the inductor L1 and the capacitor Cdc of the active filter circuit 10. Hence, there is no need to increase the capacitance of the smoothing capacitor C1 to reduce the ripple of a DC current input to the active filter circuit 10. Further, since Iin flows even when Iout1 has a phase angle near zero, power is effectively drawn from the DC power supply Vdc. In other words, in the case where the DC power supply Vdc is a solar battery panel, DC power is effectively drawn from solar energy.

Note that in the present preferred embodiment, an intelligent power module (IPM) which includes six IGBTs as a single module, for example, preferably is used. In other words, a configuration preferably is used in which, among the six IGBTs, four of them are the switch devices 21S, 22S, 23S, and 24S, and the remaining two are the rectifier device 11S and the switch device 12S, for example.

Second Preferred Embodiment

Hereinafter, a second preferred embodiment of the present invention will be described. Unlike the first preferred embodiment, the second preferred embodiment has a configuration in which the rectifier device 11S according to the first preferred embodiment includes a diode and the switch devices include MOSFETs.

Figure 12:
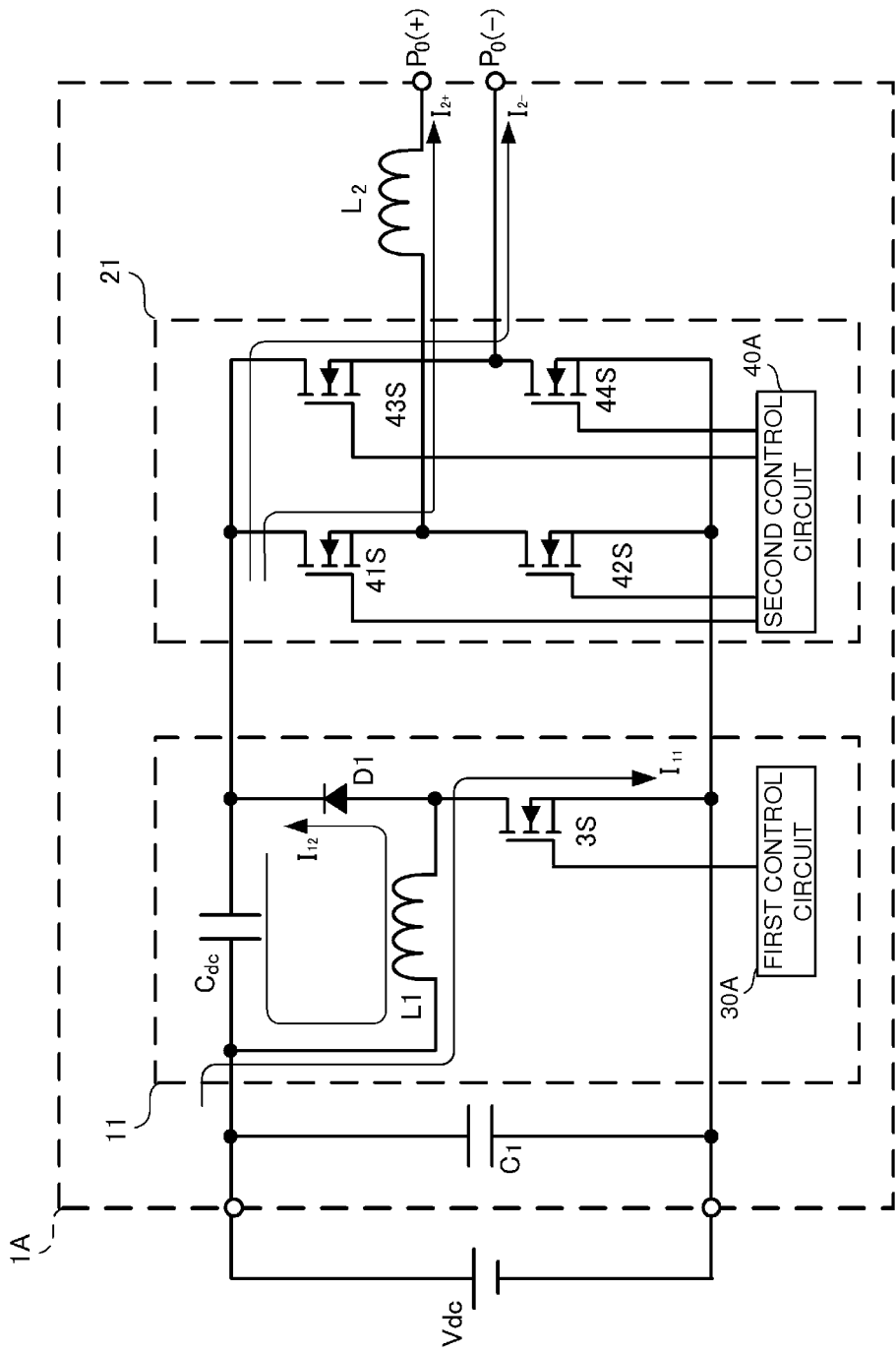
FIG. 12 is a circuit diagram of an inverter apparatus according to a second preferred embodiment of the present invention.

FIG. 12 is a circuit diagram of an inverter apparatus according to the second preferred embodiment. An inverter apparatus 1A according to the second preferred embodiment includes an active filter circuit 11 and an inverter circuit 21. The active filter circuit 11 includes a capacitor Cdc, an inductor L1, a diode (rectifier device) D1, and a switch device 3S. The capacitor Cdc is connected in series with a high-potential-side line of the active filter circuit 10. The cathode of the diode D1 is connected to the output side of the diode D1. The inductor L1 is connected between the input side of the capacitor Cdc and the anode of the diode D1. The drain of the switch device 3S is connected to the anode of the diode D1, and the source of the switch device 3S is connected to a low-potential-side line of the active filter circuit 10. The switch device 3S is subjected to PWM control performed by a first control circuit 30A.

The on/off control of the switch device 3S is similar to that for the switch device 12S according to the first preferred embodiment. The capacitor Cdc is charged as a result of the switch device 3S being subjected to PWM control performed by the first control circuit 30A. When the switch device 3S is on, a current $I_{11}$ flows through a path going through the inductor L1 and the switch device 3S. Energy is stored in the inductor L1 by the current $I_{11}$. When the switch device 3S is switched off, a current $I_{12}$ flows through a closed loop including the inductor L1, the diode D1, and the capacitor Cdc. A current output from the inductor L1 in which the electric energy has been stored is added to the current $I_{12}$. The capacitor Cdc is charged by the current $I_{12}$.

In the inverter circuit 21, a switch device 41S and a switch device 42S connected in series with each other are connected in parallel with a switch device 43S and a switch device 44S connected in series with each other. In more detail, the drain of the switch device 41S is connected to a high-potential-side line of the inverter circuit 20, and the source of the switch device 41S is connected to the drain of the switch device 42S. The source of the switch device 42S is connected to a low-potential-side line of the inverter circuit 20. The drain of the switch device 43S is connected to the high-potential-side line of the inverter circuit 20, and the source of the switch device 43S is connected to the drain of the switch device 44S. The source of the switch device 44S is connected to the low-potential-side line of the inverter circuit 20. Each of the switch device 41S, the switch device 42S, the switch device 43S, and the switch device 44S is subjected to PWM control performed by a second control circuit 40A. The on/off control of the switch devices 41S, 42S, 43S, and 44S is similar to that of the switch devices 21S, 22S, 23S, and 24S according to the first preferred embodiment.

In this manner, also when MOSFETs are used as the switch devices, effects similar to those in the first preferred embodiment are obtained. Further, by using the diode D1 as a rectifier device, the switching control for the device is not required, resulting in a simplified circuit configuration.

Note that in the present preferred embodiment, a MOSFET may be used instead of the diode D1. In this case, an intelligent power module (IPM) which is configured as a single module including six MOSFET devices may be used. In other words, a configuration may be used in which four of the six MOSFETs are switch devices of an inverter circuit and the remaining two are a rectifier device and a switch device for the active filter circuit, for example.

Third Preferred Embodiment

Hereinafter, a third preferred embodiment of the present invention will be described. An inverter apparatus according to the present preferred embodiment has a configuration in which an insulating DC-DC converter is provided between the input stage (input side) of the smoothing capacitor C1 of the second preferred embodiment and the DC power supply Vdc.

Figure 13:
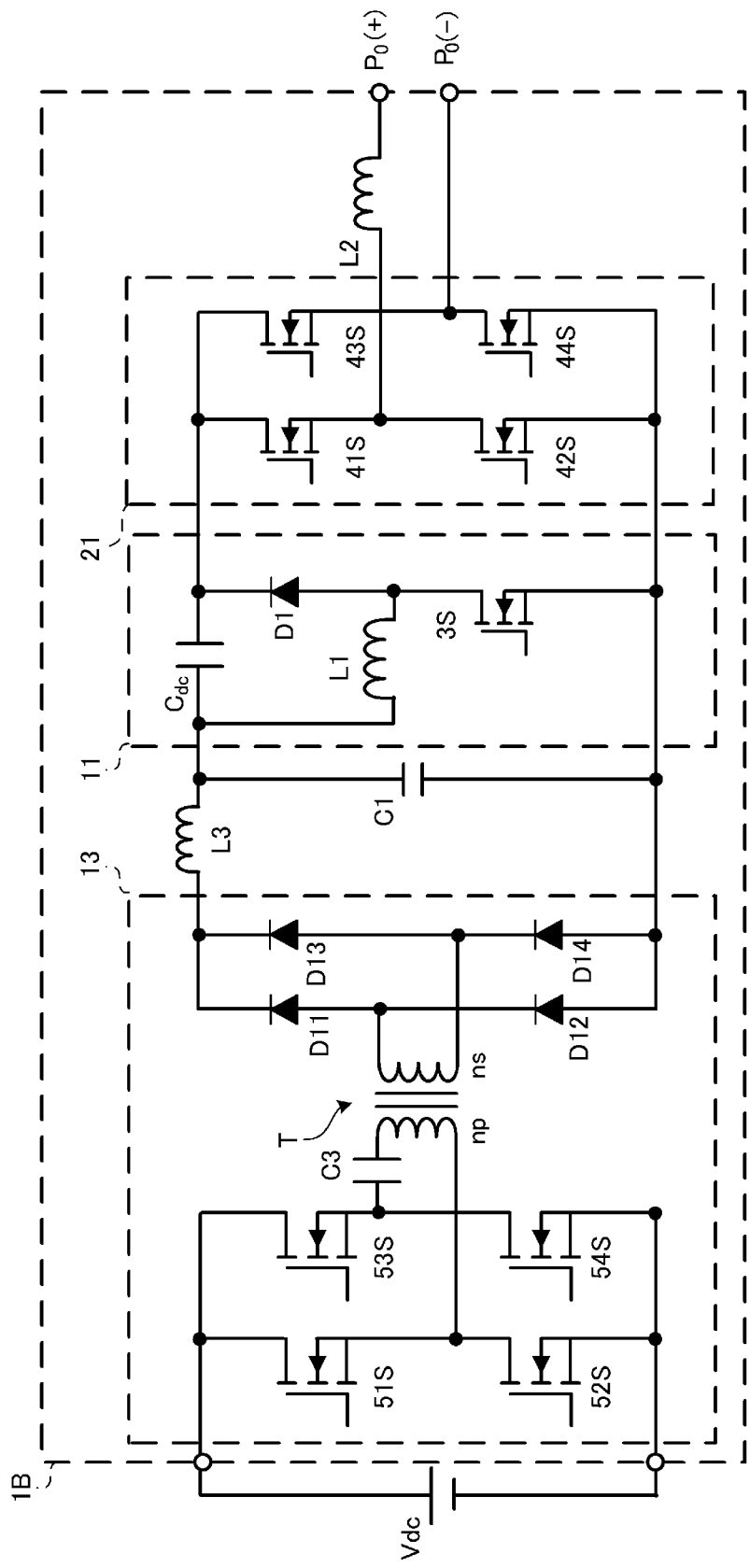
FIG. 13 is a circuit diagram of an inverter apparatus according to a third preferred embodiment of the present invention.

FIG. 13 is a circuit diagram of an inverter apparatus according to the third preferred embodiment. The active filter circuit 11 and the inverter circuit 21 provided in an inverter apparatus 1B preferably are the same as those in the second preferred embodiment. Note that the inverter apparatus 1B may have a configuration including the active filter circuit 10 and the inverter circuit 20 according to the first preferred embodiment.

On the primary side of an insulating DC-DC converter 13, a full-bridge circuit is provided and includes switching devices 51S, 52S, 53S, and 54S made of MOSFETs. A control circuit is connected to the gates of the switching devices 51S, 52S, 53S, and 54S to perform PWM control.

A primary winding np of an insulating transformer T is connected to the output of the full-bridge circuit through a capacitor C3. The capacitor C3 and the primary winding np define a resonant circuit. A diode bridge rectifier circuit including diodes D11, D12, D13, and D14 is connected to the secondary side of the insulating transformer T. In this manner, a resonant full-bridge converter is provided. The inductor L3, the smoothing capacitor C1, and the active filter circuit 11 are connected to the output stage of the insulating DC-DC converter 13.

In the inverter apparatus 1B, as a result of a state in which one of the combination of the switching devices 51S and 54S and the combination of the switching devices 52S and 53S is on at the same time and the other of the combinations is off at the same time being repeated, a resonant current generated by a resonant circuit including the capacitor C3 and the like flows through the primary winding np of the insulating transformer T. When the current flows through the primary winding np of the insulating transformer T, an electromotive force is generated in a secondary winding ns of the insulating transformer T, such that power is transmitted to the secondary side of the insulating transformer T. The power transmitted to the secondary side is rectified by the diode bridge rectifier circuit and is output to the smoothing capacitor C1. The operations of the active filter circuit 11 and the inverter circuit 21 are the same as those of the first and second preferred embodiments.

In the present preferred embodiment, as a result of the output voltage of the DC power supply Vdc being input to the smoothing capacitor C1 through the insulating DC-DC converter 13, stable supply of power to the active filter circuit 11 becomes possible, compared with the case in which the DC power supply Vdc is directly connected to the smoothing capacitor C1.

By making the insulating DC-DC converter (resonant full-bridge converter) 13 operate without control, that is, by driving the switch devices at a duty ratio of approximately 50% with a dead time between the on periods, maximum power point tracking control (MPPT control) is realized. In other words, when the input power supply is a solar battery panel, in order to draw maximum power from the solar battery, it is necessary to control a voltage so as to make the product of a current and the voltage become maximum. The current-voltage (I-V) characteristics may change in accordance with solar irradiance or the module temperature and, hence, it is important to automatically follow the optimal voltage to obtain the maximum power. Hence, the maximum power is drawn from the solar battery as a result of the insulating DC-DC converter 13 performing maximum power point tracking control (MPPT control).

Note that the design of the specific configurations of the inverter apparatuses according to the preferred embodiments described above may be appropriately changed. In the case of multiple levels, various methods such as an intermediate voltage clamp method, a flying capacitor method, and a cascade method may be used, for example. The operations and effects described in the above preferred embodiments have been provided only as most preferable operations and effects realized by the present invention, and the operations and effects of the present invention are not limited by those described in the above preferred embodiments.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inverter apparatus comprising:
   an active filter circuit configured to step up and smooth a DC voltage of an input power supply; and
   an inverter circuit configured to convert the DC voltage stepped up and smoothed by the active filter circuit into an AC voltage; wherein
   the active filter circuit includes:
      a buffer capacitor connected between an input node and an output node;
      a rectifier device;
      an inductor a first end of which is connected to the input node and a second end of which is connected to the output node through the rectifier device;
      a switch device connected between the second end of the inductor and a low-potential-side line; and
      a switching control circuit for the switch device; wherein
   the inductor is configured to store energy while the switch device is on and release the energy while the switch device is off, and the rectifier device is configured to conduct so as to allow the energy stored in the inductor to be released.

2. The inverter apparatus according to claim 1, wherein the switching control circuit is configured or programmed to control a voltage across the buffer capacitor, being charged, through PWM control of the switch device such that a voltage ripple of an output voltage of the active filter circuit is suppressed.

3. The inverter apparatus according to claim 1, wherein the rectifier device is a diode.

4. The inverter apparatus according to claim 1, wherein the rectifier device is a MOSFET or an insulated gate bipolar transistor, and the switching control circuit is configured to complementarily drive the rectifier device and the switch device.

5. The inverter apparatus according to claim 1, wherein the switch device is a MOSFET or an insulated gate bipolar transistor.

6. The inverter apparatus according to claim 1, wherein the rectifier device and the switch device are portions of a plurality of power switch devices housed in an intelligent power module.

7. The inverter apparatus according to claim 6, wherein the inverter circuit includes a bridge connection of four switch devices and the four switch devices are the power switch devices housed in the intelligent power module.

8. The inverter apparatus according to claim 1, further comprising an insulating DC-DC converter connected between the active filter circuit and the input power supply.

9. The inverter apparatus according to claim 1, wherein when the switch device is switched off and the rectifier device is switched on, a current flows through a closed loop including the inductor, the rectifier device, and the capacitor.

10. The inverter apparatus according to claim 1, wherein the inverter device is configured to generate positive half cycles and negative half cycles of an AC voltage and output the positive half cycles and negative half cycles.

11. The inverter apparatus according to claim 1, wherein the inverter circuit includes a first series circuit including first and second switch devices and a second series circuit including third and fourth switch devices, connected in parallel with each other.

12. The inverter apparatus according to claim 11, further comprising a control circuit configured to perform PWM control of the first, second, third and fourth switch devices.

13. The inverter apparatus according to claim 12, wherein the switching control circuit and the control circuit are configured to perform PWM control with different duty ratios in accordance with a phase angle of an output voltage.

14. The inverter apparatus according to claim 6, wherein the power switch devices housed in the intelligent power module include six insulated gate bipolar transistors.

15. The inverter apparatus according to claim 14, wherein four of the six insulated gate bipolar transistors define switch devices, a fifth of the six insulated gate bipolar transistors defines the rectifier device, and a sixth of the six insulated gate bipolar transistors defines the switch device connected between the second end of the inductor and a low-potential-side line.

16. The inverter apparatus according to claim 1, wherein the rectifier device includes a diode and switch devices defined by MOSFETs.

17. The inverter apparatus according to claim 1, further comprising a smoothing capacitor and an insulating DC-DC converter between an input of the smoothing capacitor and the input power supply.

18. The inverter apparatus according to claim 17, further comprising a full bridge circuit provided on a primary side of the insulating DC-DC converter.

19. The inverter apparatus according to claim 18, further comprising a resonant circuit including a capacitor and a primary winding of an insulating transformer connected to the full bridge circuit.

20. A power generation system comprising the inverter apparatus according to claim 1.

* * * * *